United States Patent
Li et al.

(10) Patent No.: US 12,553,339 B2
(45) Date of Patent: Feb. 17, 2026

(54) DEVICE FOR CHARACTERIZING AND TESTING ON-SITE BASIC PARAMETER OF NATURAL GAS HYDRATE

(71) Applicant: GUANGZHOU INSTITUTE OF ENERGY CONVERSION, CHINESE ACADEMY OF SCIENCES, Guangzhou (CN)

(72) Inventors: Xiaosen Li, Guangzhou (CN); Yi Wang, Guangzhou (CN); Jianwu Liu, Guangzhou (CN); Rui Xu, Guangzhou (CN); Zhaoyang Chen, Guangzhou (CN); Gang Li, Guangzhou (CN); Yu Zhang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 0 days.

(21) Appl. No.: 19/017,813

(22) Filed: Jan. 13, 2025

(65) Prior Publication Data
US 2026/0002442 A1   Jan. 1, 2026

Related U.S. Application Data

(63) Continuation of application No. PCT/CN2024/103570, filed on Jul. 4, 2024.

(30) Foreign Application Priority Data

Jun. 28, 2024 (CN) .......................... 202410861147.3

(51) Int. Cl.
*E21B 49/08*   (2006.01)
*E21B 25/00*   (2006.01)
*E21B 41/00*   (2006.01)
*G01N 15/08*   (2006.01)
*E21B 49/00*   (2006.01)

(52) U.S. Cl.
CPC ........ *E21B 49/0875* (2020.05); *E21B 25/005* (2013.01); *E21B 41/0099* (2020.05);
(Continued)

(58) Field of Classification Search
None
See application file for complete search history.

(56) References Cited

U.S. PATENT DOCUMENTS 11,781,428 B1 * 10/2023 Xing ................... E21B 49/0875
                                                                    73/152.01
2008/0221799 A1 * 9/2008 Murray ................ G01N 24/081
                                                                    324/303

(Continued)

FOREIGN PATENT DOCUMENTS

CN       1588022 A  *  3/2005
CN     101042387 A  *  9/2007
(Continued)

OTHER PUBLICATIONS

Machine translation of CN 1588022 (Year: 2004).*
(Continued)

*Primary Examiner* — Blake Michener
(74) *Attorney, Agent, or Firm* — Bayramoglu Law Offices LLC

(57) ABSTRACT

A device for characterizing and testing on-site basic parameter of a natural gas hydrate includes a servo transmission mechanism, a pressure-resistant manipulator, a sealing mechanism, a data acquisition system, a resistivity testing system, an outlet metering system and an undisturbed permeability testing module; the undisturbed permeability testing module is used for testing a permeability of a hydrate sample subjected to sample transfer; the pressurizing system is used for adjusting a pressure of each point in the device; the servo transmission mechanism includes a pressure-
(Continued)

resistant sample transfer manipulator and a servo driver; the servo driver is used for driving the pressure-resistant sample transfer manipulator to reciprocating motion, and the pressure-resistant sample transfer manipulator is used for separating the sample to be tested from the sheath under a pressure and pushing the sample into a holder; and the resistivity testing system is used for detecting a resistivity value.

10 Claims, 1 Drawing Sheet

(52) U.S. Cl.
CPC ....... *E21B 49/088* (2013.01); *G01N 15/0806* (2013.01); *G01N 15/0826* (2013.01); *E21B 49/001* (2013.01)

(56) References Cited

U.S. PATENT DOCUMENTS

| | | | | |
|---|---|---|---|---|
| 2020/0174037 A1* | 6/2020 | Ning | .................... | G01Q 10/045 |
| 2024/0060398 A1* | 2/2024 | Gao | ........................ | E21B 49/10 |

FOREIGN PATENT DOCUMENTS

| | | | | | |
|---|---|---|---|---|---|
| CN | 101477086 | A | * | 7/2009 | |
| CN | 101477093 | A | * | 7/2009 | |
| CN | 101718725 | A | * | 6/2010 | |
| CN | 102607885 | A | * | 7/2012 | |
| CN | 104406864 | A | * | 3/2015 | |
| CN | 109540762 | A | * | 3/2019 | ......... G01N 15/0826 |
| CN | 116773355 | A | * | 9/2023 | ............... G01N 3/12 |
| CN | 116773770 | A | * | 9/2023 | |
| CN | 116818469 | A | * | 9/2023 | ............. G01N 1/286 |

OTHER PUBLICATIONS

Machine translation of CN 101042387 (Year: 2007).*
Machine translation of CN 101477086 (Year: 2008).*
Machine translation of CN 101477093 (Year: 2008).*
Machine translation of CN 101718725 (Year: 2009).*
Machine translation of CN 102607885 (Year: 2011).*
Machine translation of CN 104406864 (Year: 2014).*
Machine translation of CN 109540762 (Year: 2018).*
Machine translation of CN 116773770 (Year: 2023).*
Machine translation of CN 116773355 (Year: 2023).*
Machine translation of CN 116818469 (Year: 2023).*

* cited by examiner

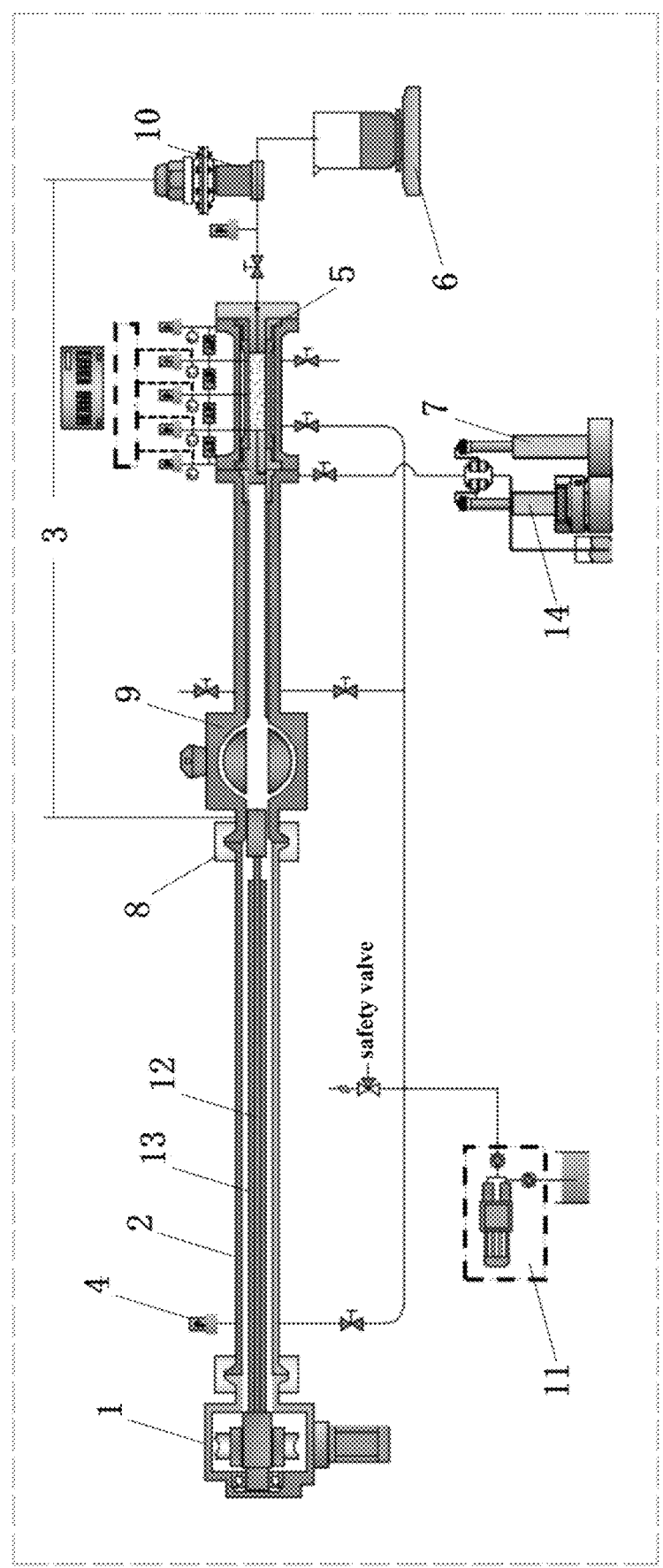

DEVICE FOR CHARACTERIZING AND TESTING ON-SITE BASIC PARAMETER OF NATURAL GAS HYDRATE

CROSS REFERENCE TO THE RELATED APPLICATIONS

This application is a continuation application of International Application No. PCT/CN2024/103570, filed on Jul. 4, 2024, which is based upon and claims priority to Chinese Patent Application No. 202410861147.3, filed on Jun. 28, 2024, the entire contents of which are incorporated herein by reference.

TECHNICAL FIELD

The present invention relates to the technical field of natural gas hydrate exploitation, in particular to a device for characterizing and testing on-site basic parameter of a natural gas hydrate.

BACKGROUND

It is considered that the deep-sea oil and gas resource realm is an important frontier territory of the petroleum industry, and deepwater and ultra-deepwater oil and gas resources have become a hot spot for the United States, Britain and other western developed countries to compete for exploitation. A main natural gas hydrate resource buried in the sea at a depth of 1-3 km is generally regarded as an unconventional oil and gas resource with huge untapped reserves, and is one of the most potential alternative energy sources in the 21st century. Its huge resource potential has attracted countries all over the world to deepen their work in exploration, experimental exploitation, and supporting environmental impact assessment. The United States, Canada, Germany and Norway, as well as countries around China such as Japan, India, South Korea and Vietnam have all formulated long-term research plans for natural gas hydrates.

With the in-depth study of the research on the natural gas hydrate, a number of experimental devices have been developed to simulate a generation and exploitation process of the natural gas hydrate. However, with the continuous deepening of the research, requirements for such experimental devices are getting higher and higher. At present, the requirements for the experimental simulation devices of the natural gas hydrate at home and abroad are approximately as follows.

(1) Experiments are Becoming More and More Comprehensive.

With the continuous deepening of scientific research, scientific research has become unitary, interdisciplinary and integrated. The design requirements for the experimental simulation devices of the natural gas hydrate have also evolved from original single functional requirements to the integrated and systematic design requirements. According to the investigation, it is found that the current experimental simulation devices of the natural gas hydrate can simulate not only the phase state relationship of the hydrate but also the sedimentary strata of the hydrate, test various physical and chemical properties of the stratum when the hydrate is generated or not, and study the stratum parameter characteristics and the like of the hydrate.

(2) the Degree of Visualization is Getting Higher and Higher.

After the development of macro science to a certain extent, it is not enough to explain the active physical phenomena. In order to analyze and understand various mechanism characteristics of the natural gas hydrate as clearly as possible, higher functional requirements are put forward for an experimental simulation system, hoping to acquire the phase state change processes of the generation, aggregation and decomposition of the natural gas hydrate in real time through the visualization technology. It is even possible to observe and record the micro-world of an object to be researched through other testing equipment.

(3) Environmental Conditions Simulated by the Experiments are Becoming Stricter and Stricter.

With the deepening of sampling of the natural gas hydrate on the spot, it is becoming more and more clear about the environment in which the natural gas hydrate is accumulated, and new challenges are posed to the experimental simulation devices. Huge stratum pressure and lower ambient temperature are necessary conditions for the generation of the natural gas hydrate. In order to create these conditions, higher requirements have been put forward for an experimental simulation system. How to accurately control the simulation environment, how to ensure the normal operation of each experimental device under harsh environmental conditions, and how to ensure the higher structural reliability of the experimental devices under such environmental conditions are focuses of the design and research of the experimental system.

(4) the Measurement Accuracy is Getting Higher and Higher.

In order to accurately explain the accumulation state of the natural gas hydrate and the influence of exploitation methods on the stratum, truly reflect the various characteristics of the natural gas hydrate in the stratum, and understand and master various mechanism relationships, higher requirements are put forward for the testing ability of the experimental simulation system. High-precision measurement and high-precision control are the necessary prerequisites for accurate simulation. For achieving this purpose, in addition to the selection of reliable and accurate sensors, higher requirements are also put forward for the design solution. How to reasonably arrange and use various components and equipment such as sensors is also a focus that affects the measurement accuracy of the experimental simulation device.

Undersea gas hydrate reservoir is a multi-phase and multi-component complex sediment system composed of natural gas, water, hydrate, ice, sand, etc., and different gas hydrate gas hydrate reservoir conditions will cause great differences in exploitation technology methods and exploitation results. Therefore, the on-site characterization technology of key geological parameters of gas hydrate target reservoir is one of the most critical technical means to detect gas hydrate before exploitation, and it is also the basis for further accurately predicting a gas hydrate production capacity in a target region and determining an exploitation solution. At present, the on-site parameter characterization and the online production capacity evaluation of the marine gas hydrate reservoir have become key technical issues in commercial gas hydrate exploitation, and it is urgent to carry out special research and development and establish a mature technology and special device system.

However, in the prior art, there are following technical difficulties.

1. How to carry out the sample transfer operation under a pressure maintenance condition to achieve the on-site direct rapid detection of a processed gas hydrate sample collected under pressure maintenance;
2. How to enable a pressure-resistant sample transfer manipulator to achieve the integration of sample transfer and testing under the pressure maintenance condition.
3. How to allow the miniaturized design to meet the quickness and portability of gas hydrate analysis and testing under the pressure maintenance condition.

SUMMARY

The present invention aims at solving the problems existing in the prior art, and provides a device for characterizing and testing on-site basic parameter of a natural gas hydrate.

In order to solve the problems existing in the prior art, the present invention adopts the following technical solutions.

A device for characterizing and testing on-site basic parameter of a natural gas hydrate includes a servo transmission mechanism, a pressure-resistant manipulator, a sealing mechanism, a data acquisition system, a resistivity testing system, an outlet metering system and an undisturbed permeability testing module, wherein the sealing mechanism includes at least a plurality of valve bodies;
the servo transmission mechanism is sequentially connected to the pressure-resistant manipulator, the resistivity testing system and the outlet metering system, and the resistivity testing system is a multi-channel resistivity testing system, and connected to both a pressurizing system and the undisturbed permeability testing module; and
when the device for characterizing and testing on-site basic parameter of a natural gas hydrate is working, reciprocating motion or rotation of a sample in the pressure-resistant manipulator is achieved by the servo transmission mechanism, data changes of pressure, temperature and resistivity of the device for characterizing and testing the on-site basic parameter of the natural gas hydrate are monitored in real time by a pressure acquisition system, a temperature acquisition system and the resistivity testing system, and a permeability of the hydrate sample is detected in real time by the undisturbed permeability testing module, so as to obtain on-site parameter data of the marine gas hydrate sample.

As an improvement of the technical solution of the device for characterizing and testing the on-site basic parameter of the natural gas hydrate, the servo transmission mechanism includes a servo motor, a servo driver, a servo rotating mechanism and a sample extractor which are sequentially connected; and
the sample extractor is used for gripping the sample, and the servo motor is used for driving the servo driver to drive the sample extractor to reciprocating motion in the pressure-resistant manipulator, and driving the servo rotating mechanism to drive the sample extractor to rotate in the pressure-resistant manipulator.

As an improvement of the technical solution of the device for characterizing and testing the on-site basic parameter of the natural gas hydrate, the pressure-resistant manipulator is capable of withstanding pressures from 0 to 40 MPa; and
the whole pressure-resistant manipulator is sleeve-shaped, a sheath is arranged outside the sample, and the servo transmission mechanism drives the sample and the sheath to reciprocating motion and rotate in the pressure-resistant manipulator.

As an improvement of the technical solution of the device for characterizing and testing the on-site basic parameter of the natural gas hydrate, the sealing mechanism includes at least two valve bodies;
the at least two valve bodies include a ball valve and a back-pressure control valve;
the ball valve is arranged between the pressure-resistant manipulator and the resistivity testing system, and the back-pressure control valve is arranged between the resistivity testing system and the outlet metering system; and
a pressure between the resistivity testing system and the undisturbed permeability testing module is ensured by the ball valve and the back-pressure control valve.

As an improvement of the technical solution of the device for characterizing and testing the on-site basic parameter of the natural gas hydrate, the undisturbed permeability testing module includes a testing mechanism and an undisturbed permeability testing injection pump connected to the testing mechanism.

As an improvement of the technical solution of the device for characterizing and testing the on-site basic parameter of the natural gas hydrate, the resistivity testing system is connected to the pressurizing system, and a pressure in the device for characterizing and testing the on-site basic parameter of the natural gas hydrate is maintained and stabilized by the pressurizing system.

As an improvement of the technical solution of the device for characterizing and testing the on-site basic parameter of the natural gas hydrate, the pressure-resistant manipulator is detachable connected to the resistivity testing system through a clamp, and the valve bodies are arranged between the clamp and the resistivity testing system.

As an improvement of the technical solution of the device for characterizing and testing the on-site basic parameter of the natural gas hydrate, the data acquisition system includes a pressure acquisition system and a temperature acquisition system, the pressure acquisition system includes pressure sensors and a pressure acquisition module, and the temperature acquisition system includes temperature sensors and a temperature acquisition module; and
the plurality of pressure sensors and the plurality of the temperature sensors acquire real-time pressure values and temperature values of different positions in the device for characterizing and testing the on-site basic parameter of the natural gas hydrate.

As an improvement of the technical solution of the device for characterizing and testing the on-site basic parameter of the natural gas hydrate, the data acquisition system further includes a computer, and data processing and analyzing software installed in the computer.

As an improvement of the technical solution of the device for characterizing and testing the on-site basic parameter of the natural gas hydrate, the outlet metering system is a high-precision electronic balance.

The present invention has the following beneficial effects.
1. In the present invention, a gas hydrate core sample which may be a 1 m gas hydrate core sample under 30 MPa can be processed, and rapid on-site measurement of the whole core such as the resistivity, permeability, porosity and hydrate saturation of the gas hydrate core can be achieved; the on-site decomposition experiment of the gas hydrate core is achieved, and key technical parameters in the exploitation of the gas hydrate such as a gas hydrate decomposition rate, a gas-liquid flow rate, a sediment shape variable and decomposed gas compositions are directly acquired; and numerical simulation software for evaluating a production capacity of the gas hydrate is equipped, such that the above key parameters of the gas hydrate core can be directly used in the simulation software to evaluate the production capacity of the gas hydrate in an objective region to be exploited, and technical support for selecting a target region to be exploited and a technical optimization solution for an exploiting method are provided.
2. By applying the present invention, the laboratory testing technology is extended to on-site testing, which will directly provide important theoretical basis and key design parameters for the research and development of on-site reservoir parameter characterization and on-line production capacity prediction devices that must be established for the industrialization of the gas hydrate in the future, fill the gap that there is no special engineering equipment for on-site testing of the gas hydrate in China, and provide important theoretical support and technical support for the industrialization process of the gas hydrate in China.
3. According to the present invention, the key technical difficulties of in-situ processing and analysis of a core drilled in the gas hydrate reservoir on the site are broken through, the analysis and the research of the natural gas hydrate on the site scale are achieved, the portability of gas hydrate analysis equipment is greatly improved, and online permeability testing and multi-channel temperature, pressure and resistivity testing are achieved.

BRIEF DESCRIPTION OF THE DRAWINGS

FIGURE is a schematic structural diagram of the present invention.

Description of reference numerals: 1, servo transmission mechanism; 2, pressure-resistant manipulator; 3, sealing testing section; 4, data acquisition system; 5, resistivity testing system; 6, outlet metering system; 7, undisturbed permeability testing module; 8, clamp; 9, ball valve; 10, back-pressure control valve; 11, pressurizing system; 12, sample; 13, sheath; and 14, undisturbed permeability testing injection pump.

DETAILED DESCRIPTION OF THE EMBODIMENTS

To make the objectives, technical solutions and beneficial effects of the present invention clearer, the technical solutions in the embodiments of the present invention will be clearly and completely described below with reference to the accompanying drawings in the embodiments of the present invention. Obviously, the embodiments described are merely some but not all embodiments of the present invention.

As shown in the FIGURE, a device for characterizing and testing an on-site basic parameter of a natural gas hydrate includes a servo transmission mechanism 1, a pressure-resistant manipulator 2, a sealing mechanism, a data acquisition system 4, a resistivity testing system 5, an outlet metering system 6 and an undisturbed permeability testing module 7, wherein the sealing mechanism includes at least a plurality of valve bodies.

The servo transmission mechanism 1 is sequentially connected to the pressure-resistant manipulator 2, the resistivity testing system 5 and the outlet metering system 6, and the resistivity testing system 5 is a multi-channel resistivity testing system 5, and connected to both a pressurizing system 11 and the undisturbed permeability testing module 7.

When the device for characterizing and testing on-site basic parameter of a natural gas hydrate is working, reciprocating motion or rotation of a sample 12 in the pressure-resistant manipulator 2 is achieved by the servo transmission mechanism 1, data changes of pressure, temperature and resistivity of the device for characterizing and testing the on-site basic parameter of the natural gas hydrate are monitored in real time by a pressure acquisition system, a temperature acquisition system and the resistivity testing system 5, and a permeability of the hydrate sample 12 is detected in real time by the undisturbed permeability testing module 7, so as to obtain on-site parameter data of the marine gas hydrate sample 12.

Specifically, according to the present invention, online permeability testing and multi-channel temperature, pressure and resistivity testing are mainly performed on the cut sample 12. Under the effect of the present invention, the gas hydrate core sample 12 can be processed, and rapid on-site measurement of the whole core such as the resistivity, permeability, porosity and hydrate saturation of the gas hydrate core can be achieved; the on-site decomposition experiment of the gas hydrate core is achieved, and key technical parameters in the exploitation of the gas hydrate such as a gas hydrate decomposition rate, a gas-liquid flow rate, a sediment shape variable and decomposed gas compositions are directly acquired; and numerical simulation software for evaluating a production capacity of the gas hydrate is equipped, such that the above key parameters of the gas hydrate core can be directly used in the simulation software to evaluate the production capacity of the gas hydrate in an objective region to be exploited, and technical support for selecting a target region to be exploited and a technical optimization solution for an exploiting method are provided.

In the present invention, the accumulation of the natural gas hydrate in nature can be directly studied, and in-situ processing and analysis of a core drilled in the gas hydrate reservoir on the site is achieved; and the device can be mounted on a gas hydrate exploration vessel or a drilling vessel, is extremely high in portability, and can further achieve the online permeability testing and multi-channel temperature, pressure and resistivity testing.

In the present invention, the sample transfer operation under a high-pressure and pressure-maintaining condition can be achieved, and the on-site direct rapid detection of the processed gas hydrate sample 12 collected under pressure maintenance is achieved; in addition, a pressure value, a temperature value, a resistance value and a permeability can be detected in real time, that is, in the present invention, the integration of sample transfer and testing under the pressure maintenance condition is achieved; and meanwhile, according to the present invention, the miniaturized design meets the testing quickness and portability of the gas hydrate analysis and testing under the pressure maintenance condition.

Specifically, in the present invention, the servo transmission mechanism 1 is used for driving the sample 12 to reciprocating motion or rotate in the pressure-resistant manipulator 2 so as to adjust the length and/or angle of the sample 12 in the present invention. The pressure-resistant manipulator 2 is used for separating the sample 12 under a pressure, that is, a separation effect of the sample 12 and the sheath 13 is completed under the high-pressure and pressure-maintaining state through the pressure-resistant manipulator 2. The sealing mechanism is used for maintaining the whole pressure in the present invention, avoiding situations that the change of the pressure value, caused by pressure leakage, adversely affects the preservation of the sample 12 and thus adversely affects a parameter testing result. The data acquisition system 4 is used for real-time detection and acquisition, so that an experimenter can obtain real-time pressure values and temperature values. The resistivity testing system 5 is used for detecting a resistivity value of a sample extractor 12 in the servo transmission mechanism 1, and saturation distribution in different regions is calculated and detected based on a value relationship between the resistivity and saturation.

According to the present invention, when in use, the sample extractor 12 in the servo transmission mechanism 1 grips the sample 12 sleeved with the sheath 13, and the sample 12 is driven to reciprocating motion or rotate in the pressure-resistant manipulator 2, so that the length and/or angle of the sample 12 in the pressure-resistant manipulator 2 can be adjusted through the servo transmission mechanism 1. In addition, under the joint action of the servo transmission mechanism 1, the pressure-resistant manipulator 2 and the sealing mechanism, the effect of separating the sample 12 from the sheath 13 is achieved under the high-pressure and pressure-maintaining state.

After being separated from the sheath 13, the sample 12 enters a testing section. The resistivity testing system 5 and the data acquisition system 4 are arranged in the, and data of pressure, temperature and resistivity in the present invention are obtained by the resistivity testing system 5 and the data acquisition system 4, respectively. In addition, the permeability of the hydrate sample 12 can be detected in real time through the undisturbed permeability testing module 7, so as to obtain the on-site parameter data of the marine gas hydrate sample 12.

It should be noted herein that the formation of the gas hydrate requires four basic conditions: low temperature, high pressure environment, a sufficient gas source and sufficient water. In the present invention, it is necessary to ensure the high pressure, pressure maintaining and sealing state of the device for characterizing and testing the on-site basic parameter of the natural gas hydrate.

In some embodiments of the present invention, the servo transmission mechanism 1 includes a servo motor, a servo driver, a servo rotating mechanism and a sample extractor which are sequentially connected.

The sample extractor 12 is used for gripping the sample 12, and the servo motor is used for driving the servo driver to drive the sample extractor 12 to reciprocating motion in the pressure-resistant manipulator 2, and driving the servo rotating mechanism to drive the sample extractor 12 to rotate in the pressure-resistant manipulator 2.

Preferably, the servo transmission mechanism 1 is further designed with a decelerating mechanism which can achieve self-locking when power-off; and the driver is designed with a pressure balance mechanism to achieve the isobaric work of a driving shaft.

Preferably, the servo transmission mechanism 1 is further equipped with a servo controller, and the servo controller is connected to a computer to achieve the effect of online control. As a specific example of this embodiment, the servo motor is imported, with the power of 1 KW, rated speed of 3,000 r/min, maximum speed of 5, 000 r/min, rated torque of 2.39 Nom, and maximum torque of 7.16 N·m.

In some embodiments of the present invention, the pressure-resistant manipulator 2 can withstand pressures from 0 to 40 MPa. The whole pressure-resistant manipulator 2 is sleeve-shaped, the sheath 13 is arranged outside the sample 12, and the servo transmission mechanism 1 drives the sample 12 and the sheath 13 to reciprocating motion and rotate in the pressure-resistant manipulator 2.

Specifically, based on the requirements of the storage environment of the gas hydrate, it is necessary to keep the gas hydrate in a high-pressure and pressure-maintaining environment, and thus, all components in the present invention should have the high-pressure resistance.

In the present invention, the pressure-resistant manipulator 2 can withstand pressures from 0 to 40 MPa. The pressure-resistant manipulator 2 includes a high-pressure and pressure-maintaining bin connected to the servo transmission mechanism 1. The high-pressure and pressure-maintaining bin is sleeve-shaped, so that the sample 12 and the sheath 13 can conveniently reciprocating motion or rotate in the pressure-resistant manipulator 2. The end of the high-pressure and pressure-maintaining bin is connected to a separator of a core holder, and is sealed by the separator of the core holder.

As a specific example of the present invention, the pressure-resistant sample transfer manipulator can withstand the pressure of 35 MPa, is made of 316 L stainless steel, and can achieve on-line displacement control with the control accuracy of ±0.5 cm.

In some embodiments of the present invention, the sealing mechanism includes at least two valve bodies.

That least two valve bodies include a ball valve 9 and a back-pressure control valve 10.

The ball valve 9 is arranged between the pressure-resistant manipulator 2 and the resistivity testing system 5, and the back-pressure control valve 10 is arranged between the resistivity testing system 5 and the outlet metering system 6.

The pressure between the resistivity testing system 5 and the undisturbed permeability testing module 7 is ensured by the ball valve 9 and the back-pressure control valve 10, so as to adjust the pressure and ensure the sealing degree of the device for characterizing and testing the on-site basic parameter of the natural gas hydrate.

In some embodiments of the present invention, the resistivity testing system 5 includes a resistivity measuring instrument.

As a specific example of the present invention, there are 10 resistivity measuring points, a measuring range is 0 to 105 Ω·cm, and the accuracy is 0.1%. Since the resistivity measuring instrument detects a resistivity value of the holder mainly by a saturation electrical measuring point, the saturation distribution in different regions is calculated and detected based on a value relationship between resistivities and saturation. Three electrodes are evenly arranged in a model, and the resistance is an effective indicator parameter for the formation and decomposition of methane hydrate. A system resistance increases rapidly when the hydrate is formed, and decreases sharply when the hydrate is decomposed. In this system, a resistivity measuring range is from 0 to 15,000 Ω·m, with the accuracy of 1%.

Further, the undisturbed permeability testing module 7 includes a testing mechanism, and an undisturbed permeability testing injection pump 14 connected to the testing mechanism. The undisturbed permeability testing injection pump 14 is used for in-situ permeability testing of the gas hydrate sample 12; and the driving structure is closed to ensure that the gas hydrate sample 12 does not decompose during the permeability testing.

Furthermore, the undisturbed permeability testing module 7 adopts a triaxial undisturbed permeability testing module 7. A rubber sleeve is adopted for ring pressure loading, so that a pressure buffer zone is formed in the rubber sleeve to ensure the safety of the present invention when in use. Meanwhile, a large-diameter high-pressure separator is designed at the top of the testing mechanism for maintaining pressure during the sample transfer. The undisturbed permeability testing injection pump 14 is used for in-situ permeability testing of the gas hydrate sample 12; and the driving structure is closed to ensure that the gas hydrate sample 12 does not decompose during the permeability testing.

As a specific example of the present invention, the undisturbed permeability testing module 7 is equipped with the undisturbed permeability testing injection pump 14 to jointly realize the ring pressure and axial pressure loading of the sample extractor 12, the loading pressure is 35 MPa, and the on-line measurement of a temperature, pressure and resistivity after the sample transfer can be achieved. The specification of the transfer sample 12 is φ 50×200 mm, 316 L; the maximum bearing capacity of the confining pressure is 35 MPa; and the accuracy of controlled pressure is ±0.1 MPa. In addition, the undisturbed permeability testing injection pump 14 is used for in-situ permeability testing of the gas hydrate sample 12; and the driving structure is closed to ensure that the gas hydrate sample 12 does not decompose during the permeability testing.

In some embodiments of the present invention, the resistivity testing system 5 is connected to a pressurizing system 11, and the pressure in the device for characterizing and testing the on-site basic parameter of the natural gas hydrate is maintained and stabilized by the pressurizing system 11. Preferably, the pressurizing system 11 includes a ring pressure and axial pressure loading pump.

In some embodiments of the present invention, the pressure-resistant manipulator 2 and the resistivity testing system 5 are detachable connected through the clamp 8, and the valve bodies are arranged between the clamp 8 and the resistivity testing system 5. After the sample 12 is transferred from the pressure-resistant manipulator 2 to the testing section as required, the sealing testing section 3 is sealed by the sealing mechanism, and then, the pressure-resistant manipulator 2 is separated from testing section through the clamp 8, so that an manipulator can operate conveniently.

In some embodiments of the present invention, the data acquisition system 4 includes a pressure acquisition system and a temperature acquisition system. The pressure acquisition system includes pressure sensors and a pressure acquisition module, and the temperature acquisition system includes temperature sensors and a temperature acquisition module.

The plurality of pressure sensors and the plurality of the temperature sensors acquire real-time pressure values and temperature values of different positions in the device for characterizing and testing the on-site basic parameter of the natural gas hydrate.

In some embodiments of the present invention, the data acquisition system 4 includes a pressure acquisition system and a temperature acquisition system. The pressure acquisition system includes a pressure sensor and a pressure acquisition module, and the temperature acquisition system includes a temperature sensor and a temperature acquisition module. The temperature sensor is used for measuring a temperature of each point in the present invention and transmitting the measured temperature information to the temperature acquisition module. The pressure sensor is used for measuring a pressure of each point in the present invention and transmitting the measured pressure information to the pressure acquisition module, so that the temperature information can be subsequently fed back to the analysis data processing software of the computer by the temperature acquisition module to be analyzed and processed.

As a specific example of the present invention, the temperature sensor module adopts a high-precision temperature sensor, with the temperature measuring range from −50° C. to 60° C. and the accuracy of 0.5%. The pressure sensor adopts a high-precision differential pressure sensor from Senex Company, with the measuring range of 30 MPa and the accuracy of 0.1% FS; and there are 7 sets of high-precision differential pressure sensors. The acquisition module is mainly used for acquiring pressure sensor data in a system flow, and the acquired data is fed back to the software through the acquisition module.

Further, the data acquisition system 4 further includes a computer, and data processing and analyzing software installed in the computer.

In some embodiments of the present invention, the data acquisition system 4, as in the prior art, includes the computer, and the data processing and analyzing software installed in the computer. A data acquisition and processing system is mainly composed of acquisition hardware and acquisition software. The acquisition hardware is mainly composed of a data acquisition card, a PLC controller and the computer. The acquisition software is based on Win7 system simulation software and system analyzing and testing software. Therefore, all-round detection and analysis of the pressure and the flow are achieved; the precise control of the undisturbed permeability testing injection pump 14 and the interface control are achieved; and data analysis and real-time data analysis of various seepage treatment reports, curves and the like are achieved.

In some embodiments of the present invention, the outlet metering system 6 is a high-precision electronic balance.

As a specific example of the present invention, the device for characterizing and testing the on-site basic parameter of the natural gas hydrate provided by the present invention includes the servo transmission mechanism 1, the pressure-resistant manipulator 2, the clamp 8, the ball valve 9, the resistivity testing system 5, the back-pressure control valve 10 and the outlet metering system 6 which are sequentially arranged from left to right. The resistivity testing system 5 is further connected to both the undisturbed permeability testing module 7 and the pressurizing system 11.

In some embodiments of the present invention, the outlet metering system 6 is a high-precision electronic balance. As a specific example of the present invention, the high-precision electronic balance has the maximum measuring range of 6200 g, the accuracy of 0.1 g, and the number of one.

When in use, the sample extractor 12 in the servo transmission mechanism 1 can grip the sample 12 sleeved with the sheath 13 to enable the sample 12 to reciprocating motion or rotate in the pressure-resistant manipulator 2, so as to adjust the length and/or angle of the sample 12. During the reciprocating motion, the effect of delivering the sample 12 to the testing section can be achieved. Meanwhile, in the pressure-resistant manipulator 2, the sample 12 and the sheath 13 are separated under a pressure, and the separated sample 12 is delivered to the testing section.

When the sample 12 is placed in the testing section, the ball valve 9 is turned off, and then, the sealing testing section 3 is formed by the ball valve 9 and the back-pressure control valve 10.

In this way, the servo transmission mechanism 1 and the pressure-resistant manipulator 2 can be separated from the testing section by the clamp 8, so as to realize the position transfer of the sealing testing section 3

Moreover, in the sealing testing section 3, a resistivity value can be obtained by the resistivity testing system 5, and the saturation distribution in different regions is calculated and detected based on a value relationship between resistivities and saturation. Meanwhile, the permeability of the sample 12 may also be tested by the undisturbed permeability testing module 7. The undisturbed permeability testing module 7 includes a testing mechanism and the undisturbed permeability testing injection pump 14 connected to the testing mechanism. A large-diameter high-pressure separator is arranged in the testing mechanism, so that the pressure can be maintained with the presence of the large-diameter high-pressure separator and the undisturbed permeability testing injection pump 14, that is, the permeability of the sample 12 can be tested under the high-pressure and pressure-maintaining condition.

All other embodiments obtained by those of ordinary skills in the art without creative efforts based on the embodiments in the present invention are within the protection scope of the present invention.

What is claimed is:

1. A device for characterizing and testing an on-site basic parameter of a natural gas hydrate, comprising: a servo transmission mechanism, a pressure-resistant manipulator, a sealing mechanism, a data acquisition system, a resistivity testing system, an outlet metering system, and an undisturbed permeability testing module, wherein the sealing mechanism comprises at least a plurality of valve bodies;
the servo transmission mechanism is sequentially connected to the pressure-resistant manipulator, the resistivity testing system and the outlet metering system, and the resistivity testing system is a multi-channel resistivity testing system, and respectively connected to a pressurizing system and the undisturbed permeability testing module; and
when the device is working, reciprocating motion or rotation of a marine gas hydrate sample in the pressure-resistant manipulator is achieved by the servo transmission mechanism, data changes of pressure, temperature and resistivity of the device are monitored in real time by a pressure acquisition system, a temperature acquisition system and the resistivity testing system, and a permeability of the marine gas hydrate sample is detected in real time by the undisturbed permeability testing module, so as to obtain on-site parameter data of the marine gas hydrate sample.

2. The device according to claim 1, wherein the servo transmission mechanism comprises a servo motor, a servo driver, a servo rotating mechanism, and a sample extractor, wherein the servo motor, the servo driver, the servo rotating mechanism, and the sample extractor are sequentially connected; the sample extractor is used for gripping the marine gas hydrate sample; and the servo motor is used for driving the servo driver to drive the sample extractor to perform reciprocating motion in the pressure-resistant manipulator, and driving the servo rotating mechanism to drive the sample extractor to rotate in the pressure-resistant manipulator.

3. The device according to claim 1, wherein the pressure-resistant manipulator is configured for withstanding pressures from 0 to 40 MPa; and
the pressure-resistant manipulator is sleeve-shaped, a sheath is arranged outside the marine gas hydrate sample, and the servo transmission mechanism drives the marine gas hydrate sample and the sheath to perform reciprocating motion and rotate in the pressure-resistant manipulator.

4. The device according to claim 1, wherein the sealing mechanism comprises at least two valve bodies;
the at least two valve bodies comprise a ball valve and a back-pressure control valve;
the ball valve is arranged between the pressure-resistant manipulator and the resistivity testing system, and the back-pressure control valve is arranged between the resistivity testing system and the outlet metering system; and
a pressure between the resistivity testing system and the undisturbed permeability testing module is ensured by the ball valve and the back-pressure control valve.

5. The device according to claim 4, wherein the undisturbed permeability testing module comprises a testing mechanism and an undisturbed permeability testing injection pump connected to the testing mechanism.

6. The device according to claim 1, wherein the resistivity testing system is connected to the pressurizing system, and the pressure in the device is maintained and stabilized by the pressurizing system.

7. The device according to claim 1, wherein the pressure-resistant manipulator is detachably connected to the resistivity testing system through a clamp, and the plurality of valve bodies are arranged between the clamp and the resistivity testing system.

8. The device according to claim 1, wherein the data acquisition system comprises the pressure acquisition system and the temperature acquisition system, the pressure acquisition system comprises a plurality of pressure sensors and a pressure acquisition module, and the temperature acquisition system comprises a plurality of temperature sensors and a temperature acquisition module; and
the plurality of pressure sensors and the plurality of temperature sensors acquire real-time pressure values and temperature values of a plurality of positions in the device.

9. The device according to claim 8, wherein the data acquisition system further comprises a computer, and data processing and analyzing software installed in the computer.

10. The device according to claim 1, wherein the outlet metering system is a high-precision electronic balance.

* * * * *